United States Patent
Bouaziz et al.

(10) Patent No.: US 10,078,423 B2
(45) Date of Patent: Sep. 18, 2018

(54) DEVICE ASSOCIATED WITH A VEHICLE AND HAVING A SPELLING SYSTEM WITH A COMPLETION SUGGESTION

(71) Applicant: AUDI AG, Ingolstadt (DE)

(72) Inventors: Tahar Bouaziz, Ingolstadt (DE); Michael Betz, Ingolstadt (DE); Carolin Koeberle, Ingolstadt (DE); Markus Doetsch, Regensburg (DE)

(73) Assignee: AUDI AG, Ingolstadt (DE)

( * ) Notice: Subject to any disclaimer, the term of this patent is extended or adjusted under 35 U.S.C. 154(b) by 19 days.

(21) Appl. No.: 14/775,963

(22) PCT Filed: Mar. 6, 2014

(86) PCT No.: PCT/EP2014/000576
§ 371 (c)(1),
(2) Date: Sep. 14, 2015

(87) PCT Pub. No.: WO2014/139648
PCT Pub. Date: Sep. 18, 2014

(65) Prior Publication Data
US 2016/0062566 A1    Mar. 3, 2016

(30) Foreign Application Priority Data
Mar. 12, 2013    (DE) .......... 10 2013 004 239

(51) Int. Cl.
*G06F 3/0482* (2013.01)
*G01C 21/36* (2006.01)
(Continued)

(52) U.S. Cl.
CPC ........ *G06F 3/0482* (2013.01); *G01C 21/3611* (2013.01); *G06F 3/0236* (2013.01);
(Continued)

(58) Field of Classification Search
CPC .. G06F 3/0237; G06F 3/0236; G06F 3/04895; G06F 3/0233; G06F 3/0234;
(Continued)

(56) References Cited

U.S. PATENT DOCUMENTS 6,011,542 A * 1/2000 Durrani ................. G06F 3/0236
345/156
7,860,536 B2 * 12/2010 Jobs ...................... G06F 3/0236
340/815.86
(Continued)

FOREIGN PATENT DOCUMENTS

CN    101319906    12/2008
CN    101625682    1/2010
(Continued)

OTHER PUBLICATIONS

Chinese Office Action dated Aug. 15, 2016 in corresponding Chinese Application No. 201480003008.1.
(Continued)

*Primary Examiner* — Amy Ng
*Assistant Examiner* — Phoebe X Pan
(74) *Attorney, Agent, or Firm* — Staas & Halsey LLP

(57) ABSTRACT

An operating unit is used to choose least alphanumeric characters and/or symbols and to combine them to form a character group. A display device displays selectable characters in a selection field and displays selected characters in an one input field. Data is stored in a storage unit. A data processing unit selects data from the data stored in the storage unit according to predefinable criteria, taking into consideration a chosen character and previously selected characters. A completion suggestion with at least one completion element is displayed in close proximity to the chosen character in the selection field, insofar as a possible completion of the chosen character and the previously
(Continued)

selected characters. The completion element is choosable by a user by the operating unit, and a chosen completion element can be selected by a user by the operating unit.

15 Claims, 1 Drawing Sheet

(51) Int. Cl.
- G06F 3/023 (2006.01)
- G06F 3/0338 (2013.01)
- G06F 3/0484 (2013.01)
- G06F 3/0488 (2013.01)
- G06F 17/24 (2006.01)

(52) U.S. Cl.
CPC .......... G06F 3/0338 (2013.01); G06F 3/0488 (2013.01); G06F 3/04842 (2013.01); G06F 17/24 (2013.01)

(58) Field of Classification Search
CPC .. G06F 3/0338; G06F 3/04842; G06F 3/0488; G01C 21/36; G01C 21/3611; G01C 21/3664
See application file for complete search history.

(56) References Cited

U.S. PATENT DOCUMENTS

| | | | | |
|---|---|---|---|---|
| 8,223,127 | B2* | 7/2012 | Park | G06F 3/0362 345/156 |
| 8,490,008 | B2* | 7/2013 | Griffin | G06F 3/0237 345/173 |
| 8,495,732 | B2* | 7/2013 | Guenthner | G06F 21/34 713/183 |
| 2001/0020212 | A1 | 9/2001 | Urban | G01C 21/3611 701/538 |
| 2006/0196925 | A1* | 9/2006 | Dong | H04M 1/7258 235/375 |
| 2008/0284782 | A1* | 11/2008 | Englerth | G06F 3/0236 345/468 |
| 2009/0326794 | A1 | 12/2009 | Lungwitz et al. | |
| 2010/0225599 | A1* | 9/2010 | Danielsson | G06F 3/0237 345/173 |
| 2010/0241627 | A1* | 9/2010 | Kondo | G01C 21/3611 707/737 |
| 2010/0271458 | A1* | 10/2010 | Shethia | H04N 5/66 348/14.08 |
| 2011/0131243 | A1 | 6/2011 | Aben et al. | |
| 2012/0206367 | A1* | 8/2012 | Griffin | G06F 3/0237 345/169 |
| 2014/0250405 | A1* | 9/2014 | Wheeler | G06F 3/0482 715/780 |
| 2015/0029090 | A1* | 1/2015 | Kim | G06F 3/017 345/156 |

FOREIGN PATENT DOCUMENTS

| | | |
|---|---|---|
| CN | 102037323 | 4/2011 |
| CN | 102236423 | 11/2011 |
| CN | 102314319 | 1/2012 |
| CN | 102478969 | 5/2012 |
| DE | 102005029781 | 9/2006 |
| DE | 102005018467 | 11/2006 |
| DE | 102007023313 | 11/2008 |
| DE | 102009032732 | 2/2010 |
| DE | 102008049636 | 4/2010 |
| DE | 102009021124 | 9/2010 |
| DE | 10 2013 004 239.9 | 3/2013 |
| EP | 1081582 | 3/2001 |
| EP | 1120633 | 8/2001 |
| WO | PCT/EP2014/000576 | 3/2014 |

OTHER PUBLICATIONS

German Office Action for German Priority Patent Application No. 10 2013 004 239.9, dated Mar. 5, 2014, 8 pages.
English language International Search report for PCT/EP2014/000576, dated Jun. 4, 2014, 2 pages.
WIPO English language translation of the International Preliminary Report on Patentability for PCT/EP2014/000576, downloaded from the WIPO website on Sep. 14, 2015, 7 pages.
German Office Action for corresponding German Patent Application No. 10 2013 004 239.9, dated Oct. 23, 2015, 11 pages.

* cited by examiner

DEVICE ASSOCIATED WITH A VEHICLE AND HAVING A SPELLING SYSTEM WITH A COMPLETION SUGGESTION

CROSS REFERENCE TO RELATED APPLICATIONS

This application is based on and hereby claims priority to International Application No. PCT/EP2014/000576 filed on Mar. 6, 2014 and German Application No. 10 2013 004 239.9 filed on Mar. 12, 2013, the contents of which are hereby incorporated by reference.

BACKGROUND

The present invention relates to a device associated with a vehicle and having a spelling system.

A plurality of devices in and/or for which user inputs can be performed are often present in modern vehicles (motor vehicles). Not only can the devices be activated or deactivated, i.e. switched on and off, but settings can often also be defined, selections made or inputs performed.

Examples of devices of this type in vehicles are a satellite-based navigation system, a multimedia system, an automobile telephone system or a device integrated into a vehicle for Internet access.

The user inputs for devices of this type can be performed in different ways, wherein an input using a push-and-rotary switch, joystick or one or more buttons represents the most commonly used method. Further input options are known, such as, for example, the use of a touchpad or a touch-sensitive display unit (screen), or by voice input. In all cases, the settings/selections/inputs performed can be displayed on a display unit (screen, head-up display).

In the case of the aforementioned devices, a sequence of characters (letters, numbers, spaces, etc.) and/or symbols can or must be selected or entered for the operation, for example in the case of the destination input for a satellite-based navigation system, the input of a new contact into, or the selection of a known contact from, the storage unit of an automobile telephone system, in the case of the operation of a device for mobile Internet access, etc.

Here, a fast, simple and user-friendly selection and input of characters and/or symbols is required, and is even highly desirable in terms a minimal distraction from the road traffic.

It is known that a simplification and/or speeding up of the input/selection can be made available to a user in that a completion of the characters/symbols already entered/selected can be offered and/or displayed to him following the input/selection of at least one character/symbol, wherein the suggestions for a completion are selected on the basis of predefinable criteria from data stored in a storage unit. In its simplest form, the data are compared with the previously entered/selected characters/symbols and only those data containing the entered/selected character/symbols in the same sequence are displayed.

The subject-matter of DE 10 2005 018 467 A1 is a method for destination selection in a navigation system in which each destination is defined from a totality of all destinations by destination parameters and a set of the possible destinations from the totality of all destinations is restricted in a stepwise manner by entering individual characters in each case for one destination parameter. It is provided that, on input of the characters of one destination parameter, a changeover can be effected to an input of a character for a different destination parameter.

DE 10 2007 023 313 A1 describes a display unit and a method for operating an electronic display unit to display a plurality of characters of a character set, in particular to display letters and/or digits. At least one character of the character set can be chosen by actuating a choosing unit and can be selected for further processing by actuating a selection unit. The characters are arranged and displayed on a curved arc-line.

DE 10 2008 049 636 A1 describes a method for entering a destination for a navigation system. The method comprises an input of a character string which is entered by a user as part of a designation of the destination, and a definition of a set of destination designations depending on the input character string. The set of destination designations is defined by selecting those destination designations from a stock of destination designations which comprise the character string. The method furthermore comprises a display of the defined set of destination designations on a display unit for the user. Finally, a selection of a destination designation made by the user from the displayed set of destination designations is entered.

DE 10 2009 021 124 A1 relates to an operating system for a vehicle with an input unit, an output unit and a speller function with which information can be entered into the operating system character-by-character and an entered character or an entered character string completes or partially completes the entered character or character string according to the list entry in the event of matching with a first character of a list entry of an information or entertainment application stored in the operating system or with the initial character string of a list entry of this type and is visually output via the output unit. In the event of a completion or partial completion of an entered character or an entered character string for a list entry, an audible feedback signal is emitted in addition to the visual display of the completed character string.

DE 10 2009 032 732 A1 describes a method for selecting a destination provided by entering a place name of a destination location by a user into the device, automatic checking whether the entered place name is unique in a predefined database of the device, and definition of a destination on the basis of the place name. In the event of ambiguity, an identifier for a geographical location within the destination is entered into the device. Furthermore, it is automatically checked whether the identifier together with the place name results in a unique location in the database.

SUMMARY

One possible object is to provide a device with which a user can simply and quickly transfer a completion of characters and/or symbols provided by a device into an input field.

The inventors propose a device allocated to a vehicle is proposed which has an operating unit with which at least alphanumeric characters and/or symbols are selectable and combinable to form a character group or functional group, and a display device with which selectable characters and/or symbols can be displayed in at least one selection field, and selected characters, symbols, a character group or functional group can be displayed in at least one input field by a display unit (e.g. a screen, head-up display). The device furthermore has a storage unit with data stored therein, and a data processing unit with which data from the data stored in the storage unit can be selected according to predefinable criteria, taking into consideration the characters and/or symbols previously selected by a user.

The device is characterized in that it is configured to display a completion suggestion with at least one completion element on the display unit in close proximity to a character or symbol chosen in the selection field, insofar as a possible completion of the previously selected character(s) and/or symbol(s) is determined by the data processing unit on the basis of the data in the storage unit, taking into consideration the character(s) and/or symbol(s) previously selected by a user and the character or symbol chosen by the user; the at least one completion element is choosable by a user by the operating unit; and a chosen completion element can be selected by a user by the operating unit.

Due to the display of a completion suggestion in close proximity to a character or symbol chosen by a user and displayed in a selection field, the user is given, on the one hand, precisely in the area of the display unit at which he is currently looking, an indication that a completion of the previously selected character(s) and/or symbol(s) is being offered by the device. Due to the physical proximity of this display to the character or symbol that has just been chosen, a possibly necessary operating action for the choice and/or selection of the completion suggestion is considerably simplified and a choice and/or selection of this type can be quickly and simply effected.

As a result, the time and attention which a user requires for the input into the device can advantageously be shortened, which is highly desirable from a safety perspective also, in terms of a minimal distraction of a user from the road traffic ("driver distraction").

According to a first advantageous development, the device is configured to display the completion suggestion immediately above or below the character or symbol chosen by the user.

According to a second advantageous development, the device is configured to display only three, preferably only two, particularly preferably only one selectable completion element in the completion suggestion.

According to a third advantageous development, the device is configured to display a selection indicator in the form of a cursor, a horizontal line, a highlight and/or a border.

The proposed device can furthermore be configured to display selectable characters and/or symbols in the at least one selection field in a single-row, linear arrangement by the display unit. It is similarly advantageous if the device is configured to combine specific characters and/or symbols in the form of at least one group and to display the at least one group in the selection field in the form of a group symbol.

The operating unit of the device may comprise at least a push-and-rotary switch, a joystick, a touchpad, a touch-sensitive display unit and/or a device for voice input and voice recognition.

It can furthermore be provided that the device is configured so that a completion element within a completion suggestion can be chosen by moving a joystick in a direction perpendicular to its axis of rotation and can be selected by pushing the joystick along its axis of rotation and/or, in the case where the completion suggestion contains only one completion element, the completion element can be chosen and selected by moving a joystick in a direction perpendicular to its axis of rotation.

The device may also comprise a smart speller by which a selected character or symbol, or a sequence of selected characters and/or symbols can be compared with data stored in the storage unit, and the device is configured to display, in the at least one selection field, only those characters and/or symbols that can be considered as the next characters and/or symbols on the basis of the selected character(s) and/or symbol(s) and the data present in the storage unit.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
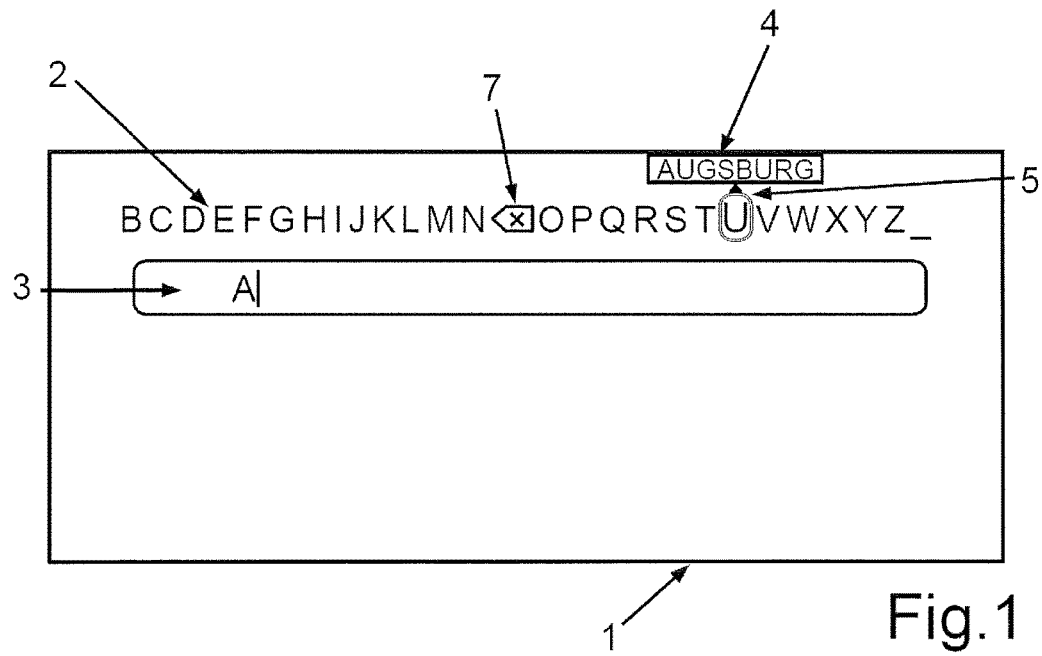
FIG. 1: A first example of a display on the display unit of one potential embodiment for the proposed device.

Reference will now be made in detail to the preferred embodiments of the present invention, examples of which are illustrated in the accompanying drawings, wherein like reference numerals refer to like elements throughout.

The illustrations in the figures are purely schematic and are not true to scale. Identical or similar elements are denoted with the same reference numbers within the figures.

Figure 2:
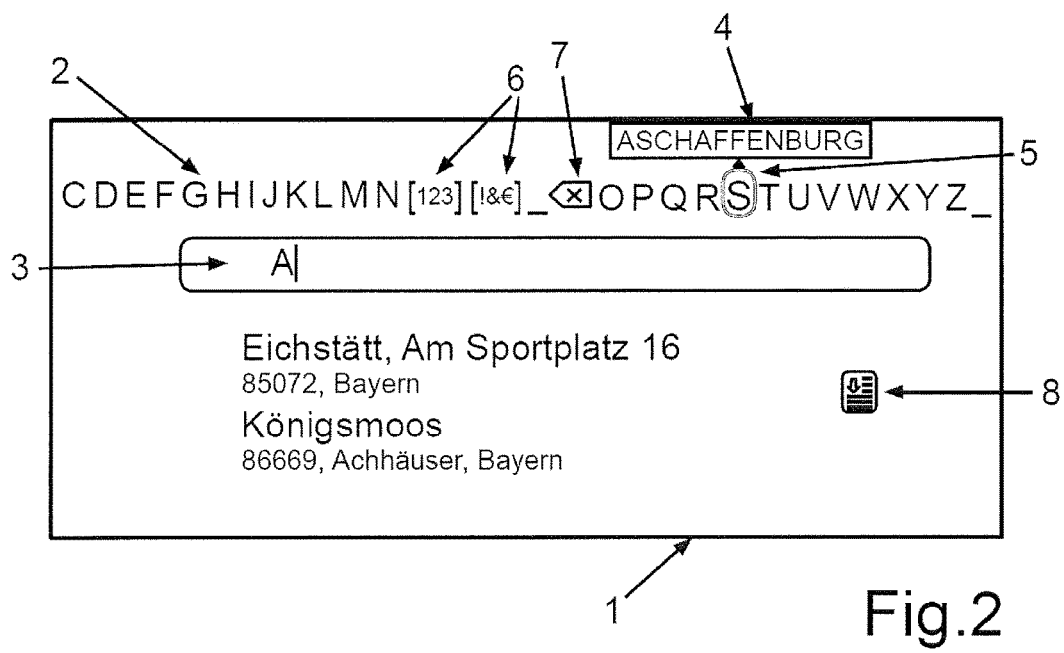
FIG. 2: A second example of a display on the display unit of the device.

As shown in FIGS. 1 and 2, the device has a display unit 1. Selectable characters and/or symbols can be displayed in at least one selection field 2, and selected characters, symbols, a character group functional group can be displayed in at least one input field 3 on the display unit 1. By an operating unit (not shown in the figures), characters (letters, numbers, spaces) and symbols (percent sign, paragraph mark, at-sign, etc.) can be chosen in the selection field 2 and can then be selected. Selected characters, symbols, a character group or functional group can be displayed in the at least one input field 3.

The arrangement of the display of the characters and symbols in the selection field 2 is not particularly restricted and any suitable arrangement can be chosen. The characters and symbols are preferably displayed in a single-row, linear arrangement on the display unit 1, as shown in FIGS. 1 and 2.

Through an actuation of the operating unit, for example a turn of a push-and-rotary switch, a swiping movement on a touchpad or touch-sensitive screen, characters and symbols from the selection field 2 can be chosen for a selection and transfer into the input field 3. Through a further operating action, a chosen character or symbol can be selected and subsequently displayed in the input field 3. A character or symbol can clearly also be chosen and selected through a single operating action, for example if the character or symbol to be selected is already displayed in the case of a selection identifier, or if, for example, a character or symbol can be chosen and selected by pressing a touch-sensitive screen.

It is provided that the device is configured to display a completion suggestion 4 with at least one completion element on the display unit 1 in close proximity to a character or symbol chosen in the selection field 2, insofar as a possible completion of the previously selected character(s) and/or symbol(s) is determined by the data processing unit on the basis of the data in the storage unit, taking into consideration the character(s) and/or symbol(s) previously selected by a user or the character or symbol chosen by the user.

The data present in the storage unit of the device may, for example, be location information (towns, streets/squares, house numbers, company names, points of interest, etc.) for a satellite-based navigation system, contact details (names, first names, telephone numbers, email addresses, dates of birth, etc.) of a telephone device, data for multimedia files stored in a multimedia system, etc. The above list is not to be understood as exhaustive and the data in the storage unit may comprise all data that are selectable by a device.

The criteria according to which it is determined by the data processing unit whether a possible completion of the previously selected character(s) and/or symbol(s) is or is not provided is not particularly restricted and all conceivable and appropriate criteria can be applied for this purpose. Some of the possible criteria are mentioned above in connection with the assessment of the related art.

If a completion suggestion 4 is displayed by the device, a completion element contained therein can be chosen and/or selected by a user by the operating unit.

If the user does not wish to perform a suggested completion of the previously selected character(s) and/or symbol(s) or to select any of the displayed completion suggestions 4, he can clearly, for example, select a chosen character or symbol by the operating unit and then choose a further character or symbol. After each such procedure, the previously selected characters and symbols and the chosen character or symbol can then be aligned by the data processing unit with the data present in the storage unit. If a possible completion is again produced by this alignment, a completion suggestion 4 is again displayed by the device in close proximity to the character or symbol chosen by the user.

A completion suggestion 4 with the completion element (s) contained therein and displayed is advantageously displayed immediately above or below the character or symbol chosen by the user.

Insofar as the terms "in close proximity" or "immediately above or below" are used in the present application, these are understood to mean that either no other elements are displayed between the chosen character or symbol and a completion suggestion 4, or only one or a small number of graphical elements which serve to identify more clearly a chosen character or symbol, the completion suggestion 4 and/or the correlation between the chosen character or symbol and the completion suggestion 4. In the examples shown in FIGS. 1 and 2, these graphical elements are present in the form of a border around the chosen character, a triangle indicating the completion suggestion 4, and a border around the completion suggestion 4.

A displayed completion suggestion 4 preferably comprises only a few selectable completion elements, preferably not more than three, even more preferably not more than two, and particularly preferably only one completion element. As a result, the time that is required by a user for a recognition and selection of a suggested element is advantageously minimized. One example in which the completion element has only one completion element is shown in FIGS. 1 and 2.

The selection identifier can preferably be displayed in the form of a cursor, a horizontal line, a highlight and/or a border. Optionally, the size and/or the color with which a chosen character or symbol is displayed may also differ from the display of the other characters or symbols present but not chosen in the selection field 2. By a representation of this type, it is, for example, simpler for a user to recognize which character or symbol is chosen.

Furthermore, the device can be configured, in the case of a letter character chosen by the operating unit and displayed in/with a selection identifier, to indicate that at least one variant with a diacritical character exists.

If, for example, due to the language selected for the device, for a letter (e.g. A), a vowel mutation (e.g. Ä) and variants using an accent (e.g. Á and À) exist, this circumstance can be indicated, for example by a display of the variants in a representation reduced in comparison with the chosen letter character above the letter character. The manner of indicating that variants exist for the letter character is not, however, restricted to this display type and can be effected in any other suitable manner.

The variants may, for example, be presented by a special manner of operating the operating unit and then at least one of the variants can be selected.

For example, in the case of a letter for which at least one variant with a diacritical character exists, the character extension can be activated by a long push/long press on the letter within the character/symbol band. The display of the character/symbol band is then extended by the respective characters associated with the letter. Following the selection of any one of these characters, for example by a further long push/long press on the character, the display of the character/symbol band is again reduced to the basic characters.

In many cases, the space for a sufficiently large display of all available characters and/or symbols on the display unit 1 may not be adequate, so that, for a selection, a "scrolling in" of characters and/or symbols not originally displayed on the display unit 1 and a "scrolling out" of characters and/or symbols originally displayed on the display unit 1 is required (e.g. in the form of an extendable character/symbol band).

The character/symbol band may have a start limit and an end limit, for example a start limit at the letter "A" and an end limit at the digit "9". A cursor jump can be provided in order to be able to move in a time-saving manner from a start limit or end limit of this type to the respective other end of the character/symbol band. If a scrolling to the respective start or end of the character/symbol band is effected, the cursor will, for example, be briefly intercepted and stopped; after a further scrolling in the same direction as before, the cursor can be animated from the visible area by a "wraparound animation" and can be shown once more on the other side of the character/symbol band.

A scrolling in and scrolling out is in many cases reducible or even avoidable if specific characters and/or symbols are combined in the form of at least one group and each group is displayed in the selection field 2 using a group symbol 6.

As shown in FIG. 2, a first group may comprise, for example, the digits 0 to 9 and a second group may comprise a plurality of symbols (!, &, €, %, §, *, etc.). A suitable group symbol 6 should be chosen for the display of a group, i.e. a display by which it is as simple as possible for a user to recognize which elements are contained in the group (in the example shown in FIG. 2 "[123]" for the group of digits 0 to 9, and "[!& € ]" for the group of symbols that can be chosen and selected). A group may, for example, be presented by a special manner of operating the operating unit and at least one element of the group can then be selected. In this respect, for example, the same operating actions can be provided as described above with reference to the character extension due to diacritical characters.

The operating unit provided in the device is not particularly restricted and any suitable operating unit can be provided. The operating unit comprises, for example, at least a push-and-rotary switch, a joystick, a touchpad, a touch-sensitive display unit and/or a device for voice input and voice recognition. One or more of the same operating units or a combination of different operating units can be simultaneously provided. If the operating unit is a touch-sensitive display unit, the operating unit and the display unit 1 of the device may be identical.

A push-and-rotary switch that can be rotated and actuated at least around one axis of rotation and which can be moved in at least one direction perpendicular to the axis of rotation can be mentioned as a preferred example of an operating unit of the device. A push-and-rotary switch of this type is often also referred to as a "joystick".

By turning a push-and-rotary switch of this type, a character, a symbol or a group, for example, can be chosen and the chosen character or symbol can be selected or the group opened (expanded) by pushing the push-and-rotary switch. A deletion identifier 7, for example, can be chosen and selected in the same way.

In the device, for example, by moving a joystick in a direction perpendicular to its axis of rotation, a completion element can be chosen within a completion suggestion 4 and can be selected by pushing the joystick along its axis of rotation. Or, in the case where the completion suggestion 4 contains only one completion element, the completion element can be chosen and selected by moving a joystick in a direction perpendicular to its axis of rotation.

If the joystick is provided in a dashboard of a vehicle, an upward or downward movement of the joystick is provided here, and if the joystick is provided between the front seats of a vehicle, a movement of the joystick along the longitudinal axis of the vehicle can be provided here. The movement direction that is most clear for a user will advantageously be chosen here for a choice or selection of a completion element, for example an upward movement of a joystick provided in a dashboard of a vehicle, if the completion element is displayed above a chosen character or symbol, as shown in FIGS. 1 and 2.

The device may also comprise a "smart speller". By a "smart speller" of this type, a selected character or symbol, or a sequence of selected characters and/or symbols can be compared with data stored in the storage unit, and only those characters and/or symbols that can be considered as the next characters and/or symbols on the basis of the selected character(s) and/or symbol(s) and the data present in the storage unit can be displayed in the at least one selection field 2.

At least one selection criterion can be predefined for "being considered", for example that a match between the selected character or symbol, or a sequence of selected characters and/or symbols and a character or symbol or a sequence of characters and/or symbols within at least one data element must be present in the data present in the storage unit. If, for example with reference to some data elements (e.g. place names, street names, first names, surnames, telephone numbers, email addresses, etc.) a match of this type exists, only the characters and/or symbols that are required for a completion of the data elements being considered will be displayed in the selection field.

This results in a simplification for a user in the choice and selection of the next character(s) and/or symbol(s), and the risk of an incorrect choice and/or incorrect selection is reduced.

Further elements can clearly be displayed on the display unit 1 of the device, such as, for example, an information or help text, an icon, on the selection of which device options are configurable, elements of an available selection list and/or a selection list identifier 8, list selection button), etc., as is partially shown in FIG. 2. These elements may similarly be activatable by corresponding operating actions.

It can furthermore also be provided that, following the selection of a character or symbol immediately adjacent to a selection identifier 5, a deletion button 7 is displayed which can be actuated by the operating unit to delete at least the last-selected character or symbol displayed in an input field.

The term "immediately adjacent" is to be understood to mean that no further character or symbol is displayed between the deletion button 7 and the selection identified 5. The deletion button 7 can substantially be displayed at any suitable position immediately adjacent to the selection identifier 5, i.e., for example, immediately to the left, right, above or below the selection identifier.

The examples shown in FIGS. 1 and 2 relate to a navigation system. The present invention is clearly not restricted to the application in a navigation system, but can be used for all types of devices allocated to a vehicle in which the choice and selection of characters and/or symbols occurs or may occur, such as, for example, a multimedia system, an automobile telephone system or a device integrated into a vehicle for Internet access.

Since it is known to a person skilled in the art how the device, the display device with the display unit 1 (e.g. screen, head-up display) can be constructed and how the components of the device must interwork so that the device has the characteristics described in the present application, this does not need to be enlarged upon in the present case.

Through the display of the completion suggestion in close proximity to a character or symbol chosen by a user, a user of the device is provided with an optimum facility for choosing and selecting a completion, offered by the device, of at least one already selected character or symbol and for transferring the completion into an input field 3.

As a result, optimal support is provided for the user. The time period and the attention that a user requires for the selection/input procedure is also reduced, thereby minimizing a distraction of the driver from the road traffic, which is unwanted in terms of road safety.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A device allocated to a vehicle and comprising:
   a display device comprising:
      a selection field to display choosable characters in a single row, linear arrangement, and to display a chosen character that was chosen from the choosable characters;
      an input field to display any selected characters, each selected character being a character that was previously chosen and then transferred into the input field; and
      an adjacent area to display a completion suggestion in close proximity to the chosen character in the selection field;
   a storage unit with data stored therein;
   a processor to select data from the data stored in the storage unit according to predefinable criteria, the data being selected to provide the completion suggestion as a possible completion of the chosen character and any selected characters; and an operating device with which a user chooses the chosen character, selects each selected character, chooses the completion suggestion, and selects a chosen completion suggestion for transferring into the input field, the operating device being integrated into the vehicle and comprising at least one of a push-and-rotary switch and a joystick, wherein the adjacent area is outside of the selection field and outside of the input field, but in close proximity to the chosen character in the selection field, the chosen character is offset from the choosable characters with a selection identifier, where the selection identifier is movable by the operating device to highlight the chosen character in the selection field, and a deletion button is provided immediately adjacent to the selection identifier, such that actuation of the deletion button with the operating device deletes a last-selected character in the input field.

2. The device as claimed in claim 1, wherein the completion suggestion is displayed immediately above or below the chosen character.

3. The device as claimed in claim 1, wherein no more than three completion suggestions are provided to the user in the adjacent area.

4. The device as claimed in claim 1, wherein only one completion suggestion is provided to the user in the adjacent area.

5. The device as claimed in claim 1, wherein the selection identifier includes at least one of a cursor, a horizontal line, a highlight and a border.

6. The device as claimed in claim 5, wherein rotation of a-the push-and-rotary switch or the joystick is used to move the selection identifier to different choosable characters in the selection field, thereby choosing the chosen character.

7. The device as claimed in claim 1, wherein the device is configured to combine specific characters to form of a group, the display device displays the group in the selection field in the form of a group symbol, and the specific characters are selected from the group consisting of alphanumeric characters and symbols.

8. The device as claimed in claim 1, wherein the operating device further comprises at least one of a touchpad, a touch-sensitive display unit and a device for voice input and voice recognition.

9. The device as claimed in claim 1, wherein
the push-and-rotary switch or the joystick has an axis of rotation, the push-and-rotary switch or the joystick also being movable in a direction perpendicular to the axis of rotation,
the completion suggestion is chosen by moving the push-and-rotary switch or the joystick in the direction perpendicular to the axis of rotation, and
after the completion suggestion is chosen, the completion suggestion is selected and transferred to the input field by pushing the push-and-rotary switch or the joystick along the axis of rotation.

10. The device as claimed in claim 9, wherein
a plurality of completion suggestions are provided in the adjacent area, and
one of the completion suggestions is chosen by moving the joystick in the direction perpendicular to the axis of rotation.

11. The device as claimed in claim 1, wherein
the push-and-rotary switch or the joystick has an axis of rotation, the joystick also being movable in a direction perpendicular to the axis of rotation, and when only one completion suggestion is provided, the completion suggestion is chosen and selected by moving the push-and-rotary switch or the joystick in the direction perpendicular to the axis of rotation.

12. The device as claimed in claim 1, wherein
the device further comprises a smart speller to compare any selected characters with data stored in the storage unit, and
the device is configured to display, in the selection field, only those characters that can be considered as the next character based on any selected characters and the data stored in the storage unit, such that impossible next characters are excluded from the selection field.

13. The device as claimed in claim 1, wherein the characters are selected from the group consisting of alphanumeric characters and symbols.

14. A device allocated to a vehicle and comprising:
a display device comprising:
a selection field to display choosable characters in a single row, linear arrangement, and to display a chosen character that was chosen from the choosable characters;
an input field to display any selected characters, each selected character being a character that was previously chosen and then transferred into the input field; and
an adjacent area to display only one completion suggestion immediately above or below the chosen character in the selection field;
a storage unit with data stored therein;
a processor to select data from the data stored in the storage unit according to predefinable criteria, the data being selected to provide the completion suggestion as a possible completion of the chosen character and any selected characters, the completion suggestion being a destination or a word completion; and
an operating device with which a user chooses the chosen character, selects each selected character, chooses the completion suggestion, and selects a chosen completion suggestion for transferring into the input field, the operating device being integrated into the vehicle and comprising at least one of a push-and-rotary switch and a joystick, wherein
the adjacent area is outside of the selection field and outside of the input field, but in close proximity to the chosen character in the selection field,
the chosen character is offset from the choosable characters with a selection identifier, where the selection identifier is movable by the operating device to highlight the chosen character in the selection field, and
a deletion button is displayed in the selection field immediately adjacent to the selection identifier, such that actuation of the deletion button with the operating device deletes a last-selected character in the input field.

15. A device allocated to a vehicle and comprising:
a display device comprising:
a selection field to display choosable characters in a single row, linear arrangement, and to display a chosen character that was chosen from the choosable characters;
an input field to display any selected characters, each selected character being a character that was previously chosen and then transferred into the input field; and an adjacent area to display a completion suggestion in close proximity to the chosen character in the selection field;

a storage unit with data stored therein;

a processor to select data from the data stored in the storage unit according to predefinable criteria, the data being selected to provide the completion suggestion as a possible completion of the chosen character and any selected characters; and an operating device with which a user chooses the chosen character, selects each selected character, chooses the completion suggestion, and selects a chosen completion suggestion for transferring into the input field, the operating device being integrated into the vehicle and comprising at least one of a push-and-rotary switch and a joystick, wherein the adjacent area is outside of the selection field and outside of the input field, but in close proximity to the chosen character in the selection field, the chosen character is offset from the choosable characters with a selection identifier, where the selection identifier is movable by the operating device to highlight the chosen character in the selection field, and a deletion button is movably provided in the selection field to be adjacent the chosen character, such that actuation of the deletion button with the operating device deletes a last-selected character in the input field.

* * * * *

UNITED STATES PATENT AND TRADEMARK OFFICE
CERTIFICATE OF CORRECTION

PATENT NO. : 10,078,423 B2
APPLICATION NO. : 14/775963
DATED : September 18, 2018
INVENTOR(S) : Tahar Bouaziz et al.

Page 1 of 1

It is certified that error appears in the above-identified patent and that said Letters Patent is hereby corrected as shown below:

In the Claims

Column 9, Line 33, In Claim 6, delete "a-the" and insert -- the --, therefore.

Signed and Sealed this
Thirteenth Day of November, 2018

Andrei Iancu
*Director of the United States Patent and Trademark Office*